(12) United States Patent
Jheng et al.

(10) Patent No.: US 8,738,081 B2
(45) Date of Patent: *May 27, 2014

(54) METHODS FOR HANDLING APPARATUS ORIGINATED COMMUNICATION REQUESTS AND COMMUNICATION APPARATUSES UTILIZING THE SAME

(75) Inventors: Yu-Syuan Jheng, Luodong Township, Yilan County (TW); Keng-Chung Lin, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 316 days.

This patent is subject to a terminal disclaimer.

(21) Appl. No.: 13/341,730

(22) Filed: Dec. 30, 2011

(65) Prior Publication Data

US 2012/0094678 A1    Apr. 19, 2012

Related U.S. Application Data

(63) Continuation of application No. 12/340,942, filed on Dec. 22, 2008, now Pat. No. 8,112,117.

(60) Provisional application No. 61/047,143, filed on Apr. 23, 2008.

(51) Int. Cl.
*H04B 1/38* (2006.01)

(52) U.S. Cl.
USPC ............... 455/558; 455/550.1; 455/552.1; 455/436; 455/416; 455/553.1; 455/417; 455/411; 455/422.1; 455/458; 455/435.1; 370/261; 370/328

(58) Field of Classification Search
USPC ........ 455/558, 550.1, 552.1, 436, 416, 553.1, 455/417, 411, 422.1, 458, 435.1; 370/261, 370/328

See application file for complete search history.

(56) References Cited

U.S. PATENT DOCUMENTS

| 5,627,875 A | 5/1997 | Kapsales |
|---|---|---|
| 6,516,190 B1 | 2/2003 | Linkola |

(Continued)

FOREIGN PATENT DOCUMENTS

| CN | 1255274 | 5/2000 |
|---|---|---|
| CN | 1358394 | 7/2002 |

(Continued)

OTHER PUBLICATIONS

English language translation of abstract of CN 1794846 (published Jun. 28, 2006).

(Continued)

*Primary Examiner* — Lam T Mai
(74) *Attorney, Agent, or Firm* — McClure, Qualey & Rodack, LLP

(57) ABSTRACT

A communication apparatus is provided. A first subscriber identity card camps on a first cell belonging to a first wireless network via a radio transceiver module and stores first contact entries each having a destination address. A second subscriber identity card camps on a second cell belonging to a second wireless network via the radio transceiver module and stores second contact entries each having a destination address. A processor receives an apparatus originated communication request with a destination address, determines whether the received destination address is currently stored in one of the first contact entries of the first subscriber identity card or one of the second contact entries of the second subscriber identity card, and transmits the apparatus originated communication request to the cell that the determined subscriber identity card camps on to establish a wireless communication with a peer device associated with the received destination address.

17 Claims, 12 Drawing Sheets

(56) References Cited

U.S. PATENT DOCUMENTS

| | | |
|---|---|---|
| 6,543,686 B1 | 4/2003 | Ritter |
| 7,171,226 B2 | 1/2007 | Crocker et al. |
| 7,174,174 B2 | 2/2007 | Boris et al. |
| 7,301,661 B2 | 11/2007 | Sagiya et al. |
| 8,112,117 B2 * | 2/2012 | Jheng et al. .................. 455/558 |
| 2002/0049073 A1 | 4/2002 | Bell |
| 2002/0099846 A1 | 7/2002 | Hicks |
| 2003/0125073 A1 | 7/2003 | Tsai et al. |
| 2004/0006512 A1 | 1/2004 | Rebsamen |
| 2004/0023687 A1 | 2/2004 | Diomelli |
| 2005/0170854 A1 | 8/2005 | Benco et al. |
| 2005/0250518 A1 | 11/2005 | Ishikawa et al. |
| 2005/0250536 A1 | 11/2005 | Deng et al. |
| 2006/0040642 A1 | 2/2006 | Boris et al. |
| 2006/0258353 A1 | 11/2006 | Makela et al. |
| 2007/0131780 A1 | 6/2007 | Ho |
| 2007/0142054 A1 | 6/2007 | Sanjeev et al. |
| 2007/0184858 A1 | 8/2007 | Landschaft et al. |
| 2008/0020773 A1 | 1/2008 | Black et al. |
| 2008/0070631 A1 | 3/2008 | Kumar |
| 2009/0005085 A1 | 1/2009 | Das |
| 2009/0291710 A1 * | 11/2009 | Jheng et al. .................. 455/558 |
| 2010/0255880 A1 * | 10/2010 | Huang et al. .................. 455/558 |
| 2010/0323657 A1 | 12/2010 | Barnard et al. |

FOREIGN PATENT DOCUMENTS

| | | |
|---|---|---|
| CN | 1383340 | 12/2002 |
| CN | 1398093 | 2/2003 |
| CN | 1777306 | 5/2006 |
| CN | 1794846 | 6/2006 |
| CN | 1812610 | 8/2006 |
| CN | 101056434 | 10/2007 |
| CN | 101094476 | 12/2007 |
| CN | 101094500 | 12/2007 |
| CN | 101098547 | 1/2008 |
| CN | 101111026 | 1/2008 |
| EP | 1 718 087 | 11/2006 |
| WO | WO 98/39938 | 9/1998 |
| WO | WO 2007/067202 | 6/2007 |

OTHER PUBLICATIONS

English language translation of abstract of CN 101111026 (published Jan. 23, 2008).

* cited by examiner

METHODS FOR HANDLING APPARATUS ORIGINATED COMMUNICATION REQUESTS AND COMMUNICATION APPARATUSES UTILIZING THE SAME

CROSS REFERENCE TO RELATED APPLICATIONS

This application is a Continuation of co-pending application Ser. No. 12/340,942, filed on Dec. 22, 2008, which claims the benefit of U.S. Provisional Application No. 61/047,143 filed 2008 Apr. 23 and entitled "Systems and methods for handling operations related to two (U)SIM cards". The entire contents of which are hereby incorporated by reference.

BACKGROUND OF THE INVENTION

1. Field of the Invention

The invention relates to methods for handling apparatus originated communication requests in a communication apparatus, and more particularly to methods for handling apparatus originated communication requests with the considerations of user preference.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) communication system is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. In order to provide user preference services, methods for handling apparatus originated communication requests are provided.

BRIEF SUMMARY OF THE INVENTION

Communication apparatuses are provided. An embodiment of such a communication apparatus comprises at least one radio transceiver module, a first subscriber identity card, a second subscriber identity card and a processor. The first subscriber identity card camps on a first cell belonging to a first wireless network via a radio transceiver module and stores first contact entries each having a destination address. The second subscriber identity card camps on a second cell belonging to a second wireless network via the radio transceiver module and stores second contact entries each having a destination address. The processor receives an apparatus originated communication request with a destination address, determines whether the received destination address is currently stored in one of the first contact entries of the first subscriber identity card or one of the second contact entries of the second subscriber identity card, and transmits the apparatus originated communication request to the cell that the determined subscriber identity card camps on to establish a wireless communication with a peer device associated with the received destination address.

Another embodiment of a communication apparatus comprises at least one radio transceiver module, a first subscriber identity card, a second subscriber identity card and a processor. The first subscriber identity card camps on a first cell belonging to a first wireless network via the radio transceiver module, and stores a plurality of first contact entries each comprising a destination address. The second subscriber identity card camps on a second cell belonging to a second wireless network via the radio transceiver module, and stores a plurality of second contact entries each comprising a destination address. The processor, coupled to the first subscriber identity card, the second subscriber identity card and the radio transceiver module, receives message data and an apparatus originated communication request with a plurality of destination addresses, determines whether each received destination address is currently stored in one of the first and second subscriber identity cards, groups the destination addresses currently stored in the first contact entries into a first group, groups the destination addresses currently stored in the second contact entries into a second group, sends the message data to the destination addresses of the first group via the first cell and sends the message data to the destination addresses of the second group via the second cell.

Another embodiment of a communication apparatus comprises at least one radio transceiver module, a first subscriber identity card, a second subscriber identity card and a processor. The first subscriber identity card camps on a first cell belonging to a first wireless network via the radio transceiver module. The second subscriber identity card camps on a second cell belonging to a second wireless network via the radio transceiver module. The processor, coupled to the first subscriber identity card, the second subscriber identity card and the radio transceiver module, receives an apparatus originated communication request with a plurality of destination addresses for establishing a wireless conference communication with a plurality of peer devices having the received destination addresses, determines whether each received destination address corresponds to one of the first and second subscriber identity cards, sends the apparatus originated communication request to the first cell when most of the received destination addresses correspond to the first subscriber identity card, and sends the apparatus originated communication request to the second cell when most of the received destination addresses correspond to the second subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

Figure 1:
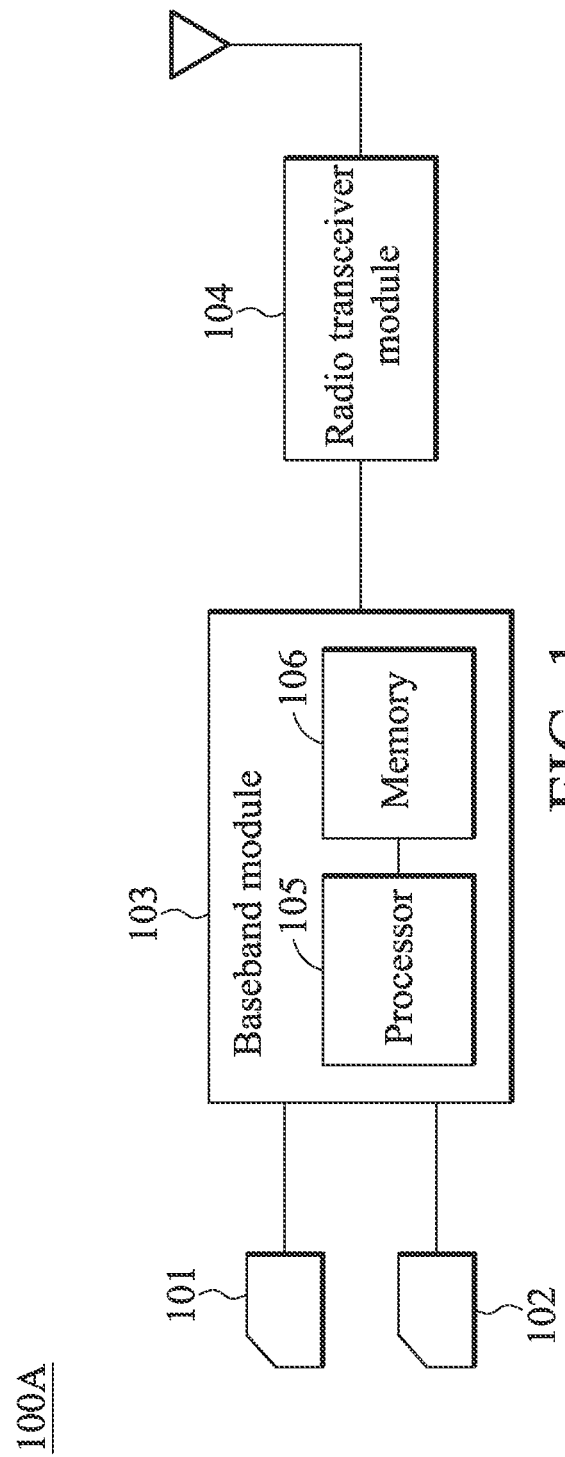
FIG. 1 shows a communication apparatus according to an embodiment of the invention.

FIG. 1 shows a communication apparatus capable of handling apparatus originated communication requests with the considerations of user preference according to an embodiment of the invention. As shown in FIG. 1, a communication apparatus 100A comprises subscriber identity cards 101 and 102, a baseband module 103, and a radio transceiver module 104, wherein the baseband module 103 is coupled to the subscriber identity cards 101 and 102, and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM) communication system, or 1900 MHz for a Universal Mobile Telecommunications System (UMTS) communication system. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged subscriber identity cards 101 and 102 and writes data to the plugged subscriber identity cards 101 and 102. It is to be noted that the memory device 106 may also be configured outside of the baseband module 103 and the invention should not be limited thereto.

Figure 2:
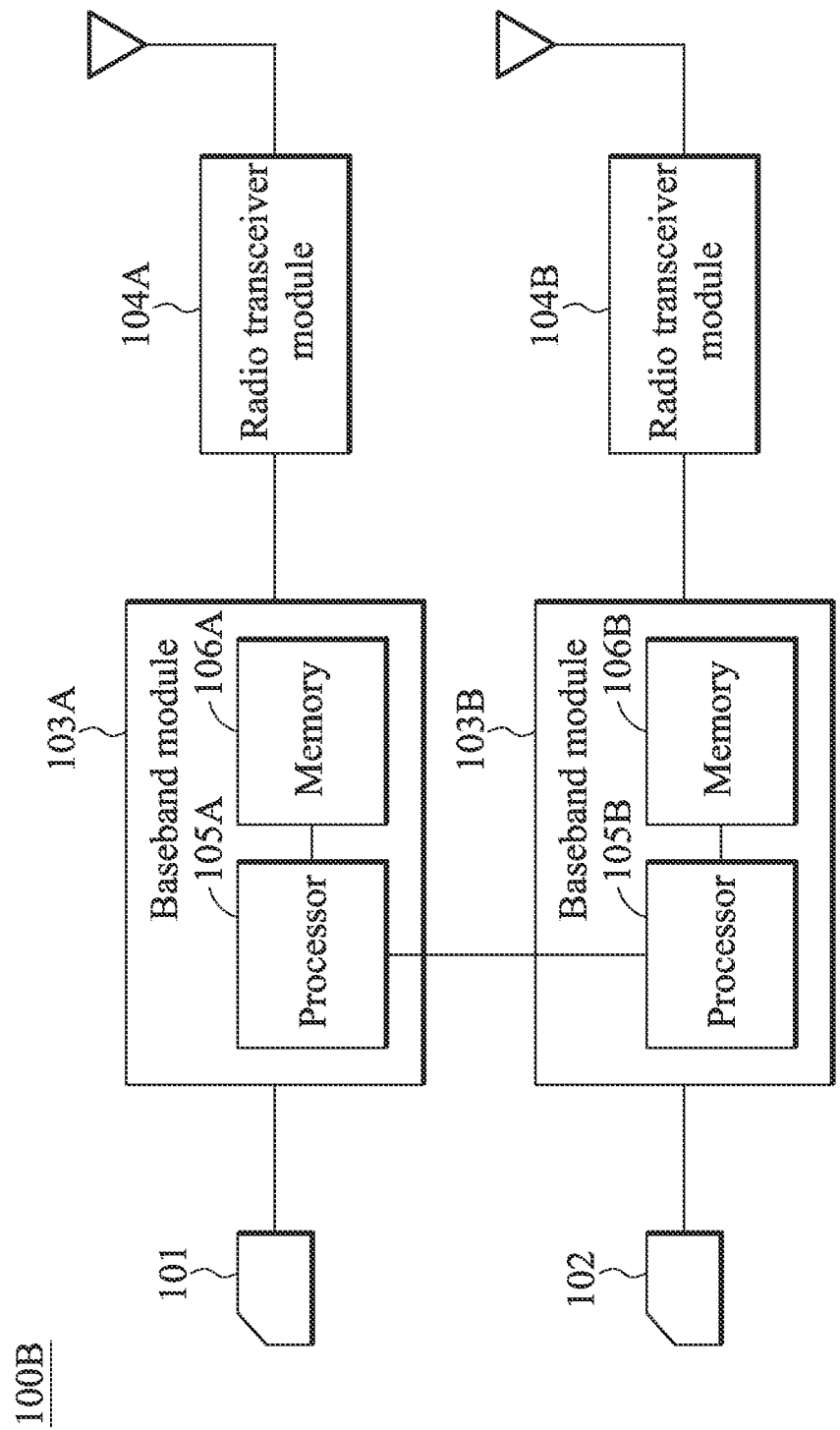
FIG. 2 shows a communication apparatus according to another embodiment of the invention.
Figure 3:
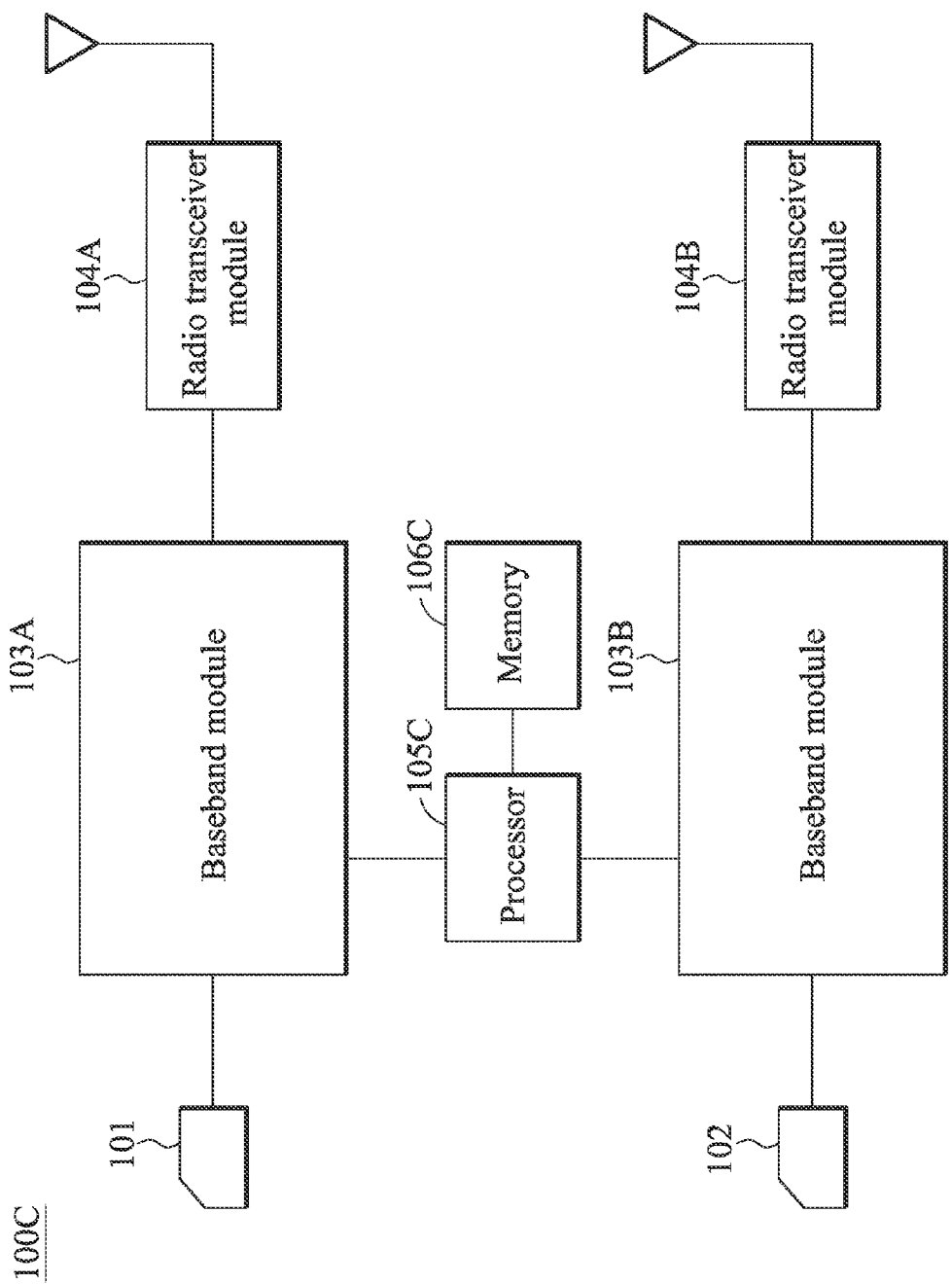
FIG. 3 shows a communication apparatus according to another embodiment of the invention.

According to another embodiment of the invention, the communication apparatus comprising more than one subscriber identity card, and may also comprise more than one baseband module and radio transceiver module, respectively, for each subscriber identity card. FIG. 2 and FIG. 3 respectively show communication apparatuses according to another embodiment of the invention. As shown in FIG. 2, communication apparatuses 100B and 100C comprise subscriber identity cards 101 and 102, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The operations of the baseband modules 103A and 103B are similar with that of the baseband module 103 and are not described here for brevity. Similarly, the operations of the radio transceiver module 104A and 104B are similar with that of the radio transceiver module 104 and are not described here for brevity. It is noted that in FIG. 2, the baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processor may be a master processor and the other one may be a slave processor to cooperate with the master processor. As shown in FIG. 3, according to a still another embodiment of the invention, the communication apparatus 100C may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processor 105 and are not described here for brevity. The described processors 105, 105A, 105B and 105C may be general-purposed processors and execute program code to perform the mentioned control operations. The described memory 106, 106A, 106B and 106C may comprise at least one of read only memory (ROM), random access memory (RAM), NOR flash and NAND flash for storing program code and data.

Figure 4:
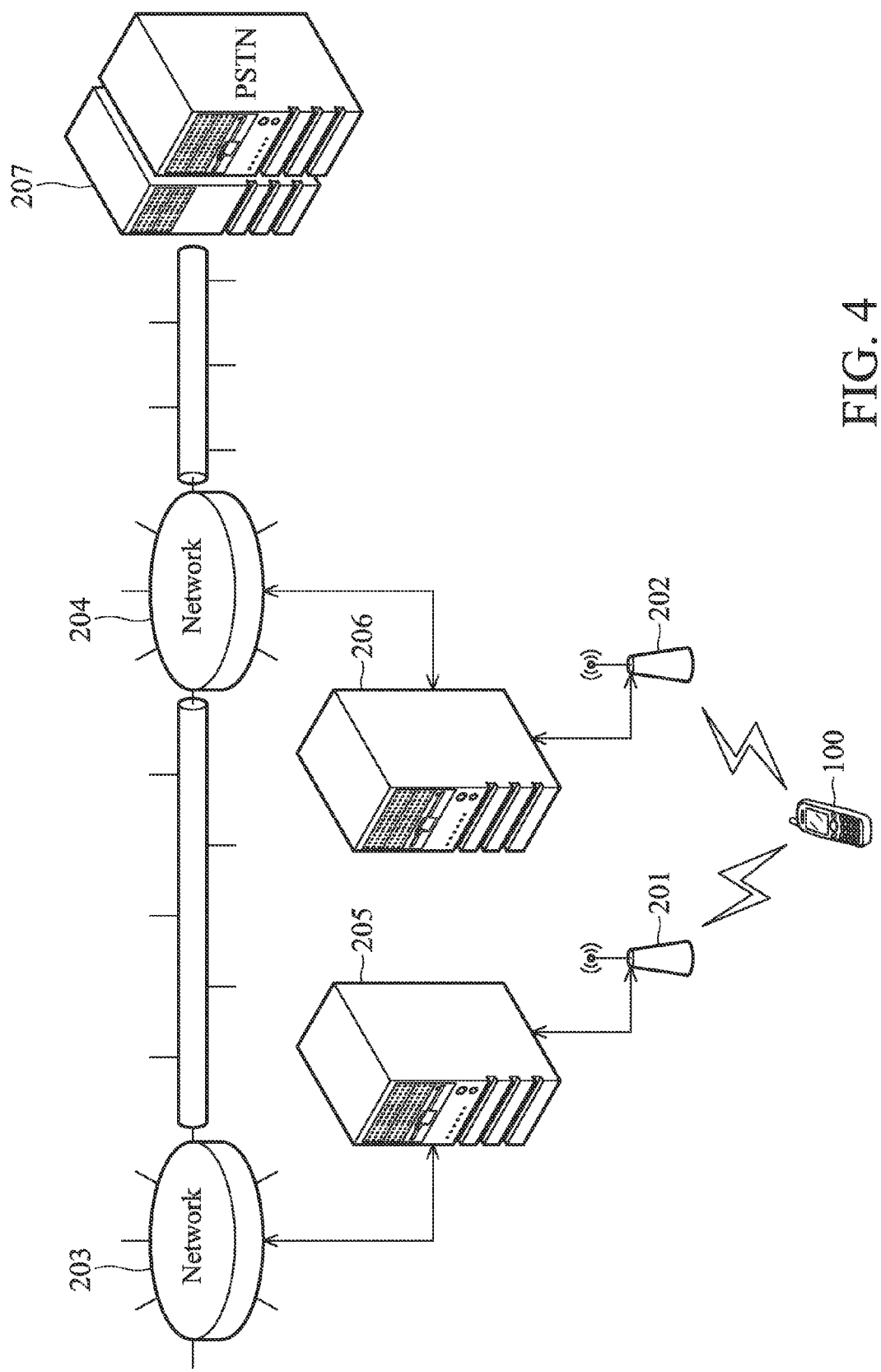
FIG. 4 shows an exemplary network topology according to an embodiment of the invention.

FIG. 4 shows an exemplary network topology according to an embodiment of the invention. The communication apparatus 100 shown in FIG. 4, may be one of the communication apparatuses 100A, 100B and 100C previously described in FIG. 1 to FIG. 3. Thus, from hereinafter, the communication apparatus 100 will be used to represent all like previously described apparatus for brevity. The communication apparatus 100, equipped with more than one subscriber identity card, may simultaneously access more than one network 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.1a, 802.1b or 802.1g. The communication apparatus 100 may issue an apparatus originated communication request, also referred to as mobile originated (MO) call request, such as a voice communication request (e.g. a voice call), a data communication request (e.g. a data call), a video communication request (e.g. a video call), a short message service (SMS) communication request, a conference communication request (e.g. a conference call), a group short message service (SMS) communication request, or a voice over Internet Protocol (VOIP) communication request (e.g. a VOIP call), to a called party (i.e. the corresponding peer with a destination address of another wired or wireless communication apparatus) through at least one of the networks 203 and 204 with corresponding intermediary apparatuses 205 and 206 (for example, the GSM network with a Base Station Controller (BSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. The apparatus originated communication request is a communication request initiated from the communication apparatus 100 for establishing wireless communication with the destination peer communication apparatus. An address of the apparatus originated communication request may be, as an example, a series of numbers directed to a specific subscriber identity card, such as an Internet Protocol (IP) address for a VOIP call or a phone number for a circuit switch call, or others. Moreover, the communication apparatus 100 may receive an apparatus terminated communication request, also referred to as mobile terminated (MT) call request, such as an incoming voice communication request (e.g. an incoming voice call), an incoming data communication request (e.g. incoming data call), an incoming video communication request (e.g. an incoming video communication call), or an incoming voice over Internet Protocol (VOIP) communication request (e.g. an incoming VIOP call) with any of the subscriber identity cards from a calling party (i.e. an origination peer with an origination address of another wired or wireless communication apparatus). The apparatus terminated communication request is a communication request initiated from the origination peer communication apparatus to request to establish wireless communication with the communication apparatus 100. It is to be understood that there may be one or more gateways positioned between heterogeneous types of networks.

According to an embodiment of the invention, any of the subscriber identity cards 101 and 102 may relate to one type of wireless communication system. For example, the subscriber identity card 101 or 102 may be the subscriber identity module (SIM) card corresponding to the GSM communication system, or the universal subscriber identity module (USIM) card corresponding to the UMTS communication system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contact entries. The processor, such as 105, 105A, 105B or 105C, of the baseband module, such as 103, 103A or 103B, may interact with a micro control unit (MCU) of the SIM card to fetch data or SAT commands from the plugged SIM card. The communication apparatus 100 is immediately programmed after being plugged into the SIM card. The SIM card may also be programmed to display custom menus for personalized services. The communication apparatus 100 may be plugged into an USIM card for UMTS (also called 3G) telephony communication. The USIM card stores user account information, IMSI, authentication information and a set of USIM Application Toolkit (USAT) commands and provides storage space for text messages and phone book contact entries. The baseband processor 105, 105A, 105B or 105C may interact with an MCU of the USIM card to fetch data or SAT commands from the plugged USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number, that may be within a range, by using a window mechanism to avoid replay attacks, and generates the session keys CK and IK to be used in the confidentiality and integrity algorithms of the KASUMI (also termed A5/3) block cipher in the UMTS. The communication apparatus 100 is immediately programmed after being plugged into the USIM card. The IMSI is a unique number associated with a global system for mobile communication (GSM) communication system or a universal mobile telecommunications system (UMTS) communication system network user. The IMSI may be sent by the communication apparatus 100 to the GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

Figure 5:
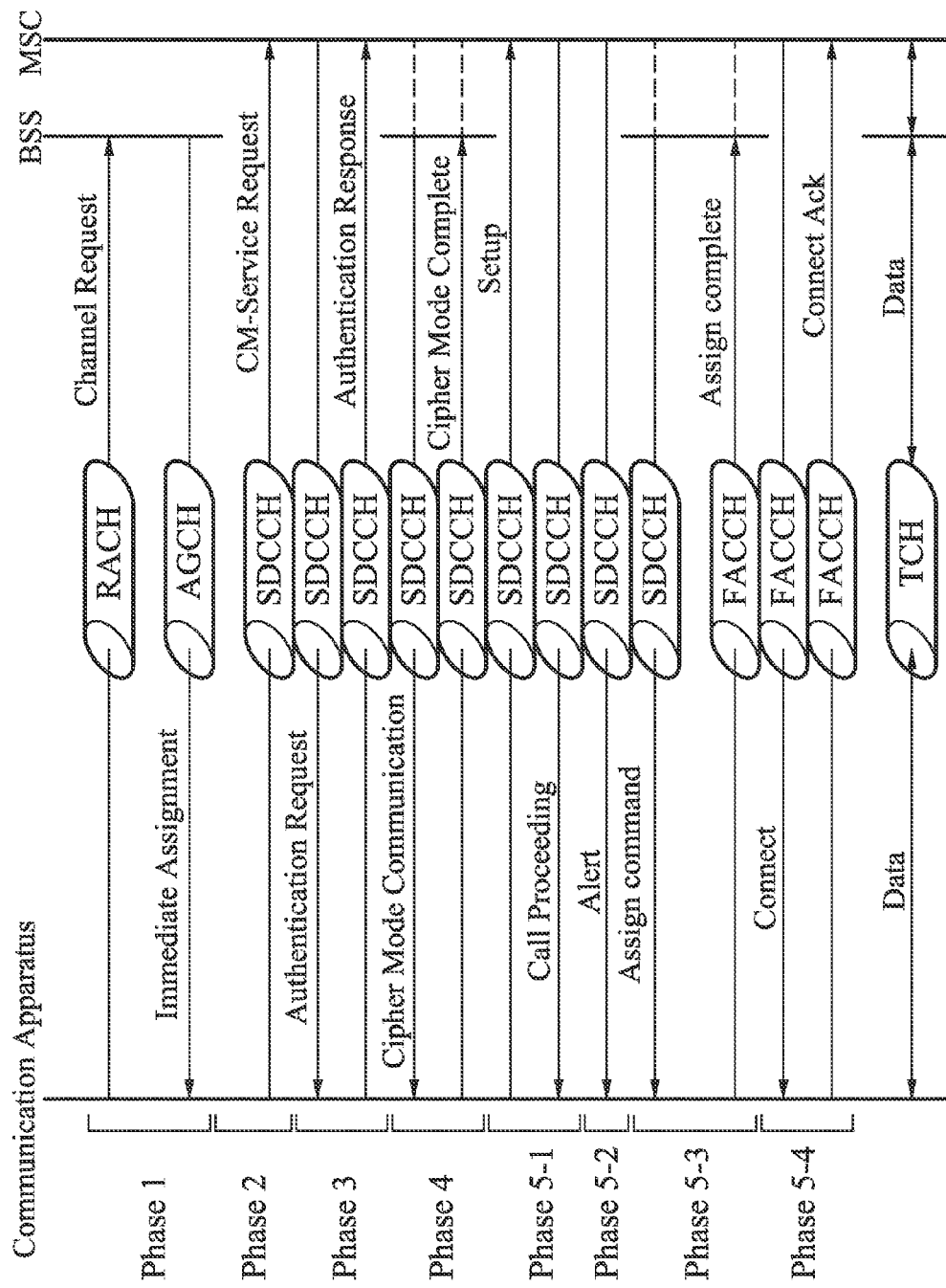
FIG. 5 shows logical channel assignments and signaling procedures of an apparatus originated communication request in the GSM.

FIG. 5 shows exemplary logical channel assignments and signaling procedures of an apparatus originated communication request, may also referred to as a mobile originated (MO) request, in a GSM communication system, such as a voice communication request. In the GSM communication system, a Call Control (CC), comprises procedures to establish, control, and terminate a communication service, and is an element of Connection Management (CM). When the communication apparatus 100 plans to originate a communication service, such as a voice call service, the CC entity first requests a Mobility Management (MM) connection from the local MM entity (Phase 1) via a Random Access Channel (RACH). For a standard call, the communication apparatus 100 may need to register with the wireless network, whereas for an emergency call, registration is only optionally required. That is, an emergency call may be established on an uncinphered Radio Resource (RR) connection from a communication apparatus 100 that has not registered with the wireless network. The base station system (BSS) in the wireless network may assign a Stand-alone Dedicated Control Channel (SDCCH) or a Traffic Channel (TCH) via an Immediate Assignment carried in the Access Grant Channel (AGCH). After the process of sending out a CM-service request (Phase 2), authentication (Phase 3) and ciphering (Phase 4) with the MSC via the SDDCH is completed, an MM connection is established. After successful establishment of the MM connection and activation of the user data encryption, the service-requesting CC entity is informed. Thus, the signals on the connection desire to connect to the CC entity in the Mobile Switching Center MSC (SETUP). The MSC may respond to the connection request in several ways. The MSC may indicate with a message Call Proceeding (Phase 5-1) that the call request has been accepted and that all the necessary information for the setup of the call is available. Otherwise, the call request may be declined with a message Release Complete. Next, the communication apparatus 100 receives the Alert message (Phase 5-2) when the MSC is trying to connect to the called party. As soon as the called party sends the Alert message and accepts the call, the communication apparatus 100 receives an Assign Command and a dedicated channel will be assigned after the communication apparatus 100 responds to an Assignment Complete message via a Fast Associated Control Channel (FACCH) (Phase 5-3). The communication apparatus 100 next responds with a Connect Acknowledge message after receiving the Connect message from the MSC (Phase 5-4), and the traffic channel, successfully established on the TCH and the communication apparatus 100, may now begin to communicate with the called party. It is to be noted that the CC procedure of the WCDMA or TD-SCDMA communication system, also well-known in the art, is similar to that of GSM communication system and is not further described for brevity. It is to be understood that, although FIG. 5 illustrates so-called late assignments, the invention is not limited thereto. Those skilled in the art may realize the following embodiments in well-known early assignments or very early assignments.

Figure 6:
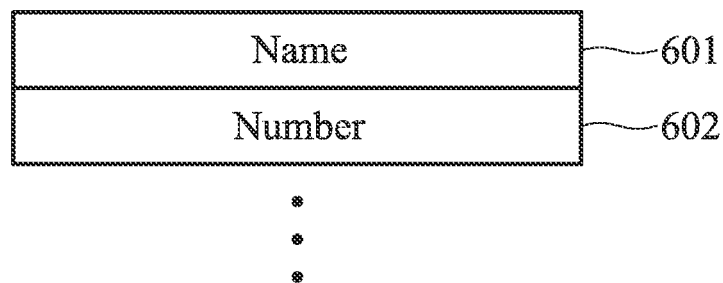
FIG. 6 shows an exemplary data structure for a contact entry stored in the subscriber identity card according to an embodiment of the invention.

According to the embodiments of the invention, the methods for handling apparatus originated communication requests in a communication apparatus, such as the communication apparatus 100A, 100B, or 100C previously described and the communication apparatus 100, used to represent all like previously described apparatuses for brevity, will be described in the following. The subscriber identity card 101 camps on a cell, hereinafter called $Cell_A$ for brevity, belonging to a wireless network, hereinafter called $NW_A$ for brevity, via the radio transceiver module 104 or 104A, and stores a plurality of first contact entries each comprising a destination address associating with a peer communication apparatus (or so-called a peer device). Similarly, the subscriber identity card 102 camps on a cell, hereinafter called $Cell_B$ for brevity, belonging to a wireless network, hereinafter called $NW_B$ for brevity, via the radio transceiver module 104 or 104B, and stores a plurality of second contact entries each comprising a destination address associating with a peer communication apparatus. It is to be noted that $Cell_A$ and $Cell_B$ may be the same or different cells belonging to the same or different wireless networks $NW_A$ and $NW_B$ of the same or different communication technologies, and the invention should not be limited thereto. FIG. 6 shows the data structure for an exemplary contact entry 600 stored in the subscriber identity card 101 or 102 according to an embodiment of the invention. The "Name" field 601 may be used to store a contact name for another peer user. The "Number" field 602 may be used to store the destination address of a peer communication apparatus. The destination address may be a series of numbers directed to the peer user, such as an IP address for a VOIP call or a phone number of another wired or wireless communication apparatus for a circuit switch call, or others. It is to be understood that the contact entry may further comprise other fields for storing additional information corresponding to the peer user and the invention should not be limited thereto. The user may input and store contact data in the corresponding fields of the communication apparatus 100, as shown in FIG. 6, via a man-machine interface (MMI). The MMI may comprise screen menus and icons, command language and online help displayed on a display of the communication apparatus 100, with at least one input device of a touch panel, physical keys on a key pad, buttons, dragging jogs and the similar. By using input devices of the MMI, users may manually touch, press, click, rotate or move the input devices to operate the communication apparatus 100.

Figure 7:
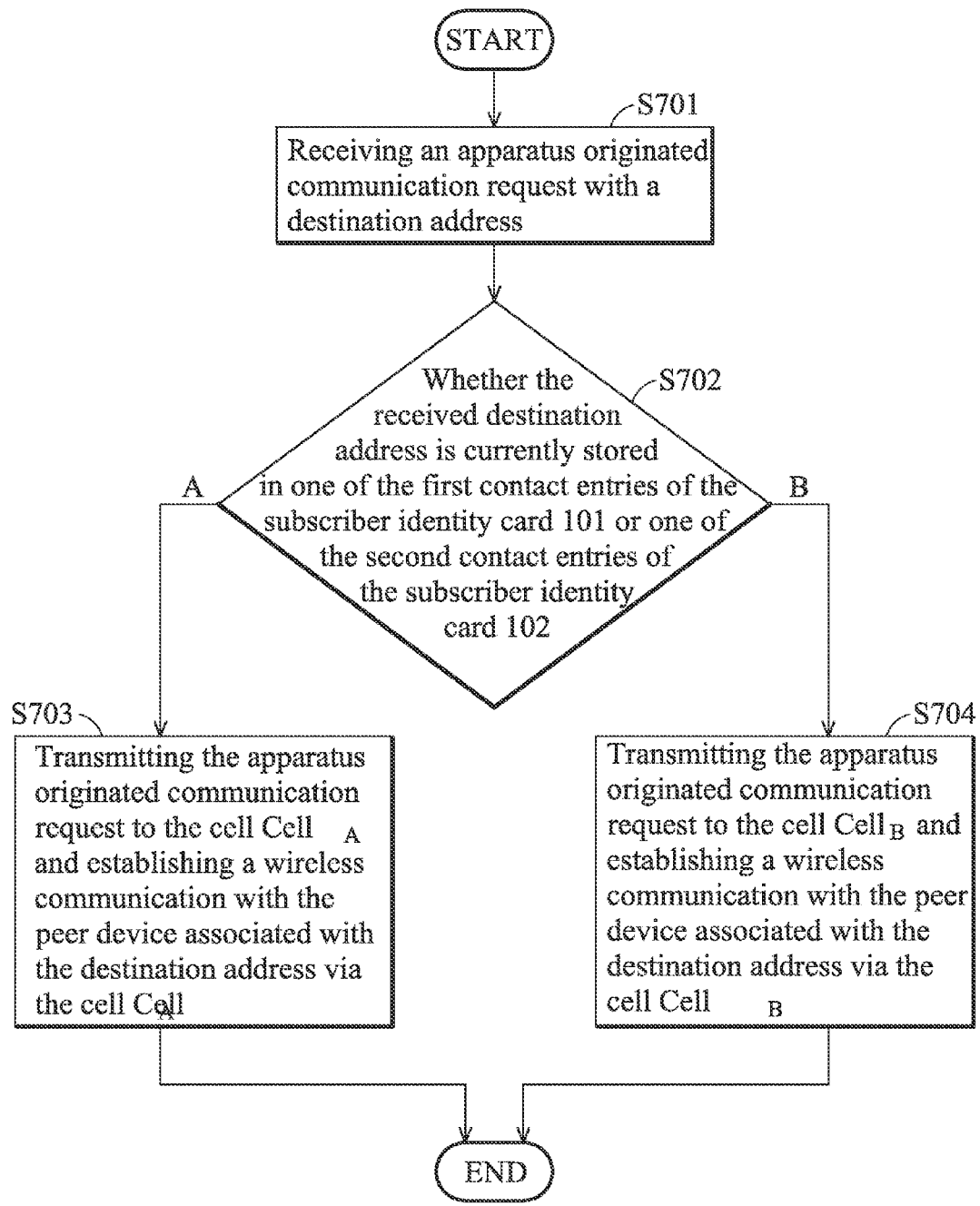
FIG. 7 shows a flow chart of the method for handling the apparatus originated communication request according to an embodiment of the invention.

FIG. 7 shows a flow chart of the method for handling the apparatus originated communication request according to a first embodiment of the invention. The embodiment begins when the processor, such as 105, 105A, 105B, or 105C, receives an apparatus originated communication request with a destination address (Step 701). According to the embodiment of the invention, the apparatus originated communication request may be a voice communication request (e.g. a voice call), a data communication request (e.g. a data call), a video communication request (e.g. a video call), a short message service (SMS) communication request, or a voice over Internet Protocol (VOIP) communication request (e.g. a VOIP call) for establishing a wireless communication with a peer device associated with the destination address. Next, the processor determines whether the received destination address is currently stored in one of the first contact entries of the subscriber identity card 101 or one of the second contact entries of the subscriber identity card 102 (Step S702). The process may query the subscriber identity cards 101 and 102 by issuing commands such as READ RECORD, SELECT EF_ADN and the similar to find out whether the received destination address is currently stored in one first or second contact entry. The processor may determine that the contact information is currently stored in the subscriber identity card 101 or 102 according to the results in response to the issued commands as described above. When the received destination address is also stored in the subscriber identity card 101, the process goes to the path A and the processor transmits the apparatus originated communication request to the cell $Cell_A$ and establishes a wireless communication with the peer device (or peer communication apparatus) associated with the destination address via the cell $Cell_A$ (Step S703). Alternatively, when the received destination address is also stored in the subscriber identity card 102, the process goes to the path B and the processor transmits the apparatus originated communication request to the cell $Cell_B$ and establishes a wireless communication with the peer device (or peer communication apparatus) associated with the destination address via the cell $Cell_B$ (Step S704).

According to another embodiment of the invention, the contact entries may also be copied to a volatile or nonvolatile region of the memory device 106, 106A, 106B or 106C. The memory device 106, 106A, 106B or 106C may store a plurality of third contact entries, wherein certain fields of the third contact entries are copied from the first and second contact entries of the subscriber identity cards 101 and 102.

Figure 8:
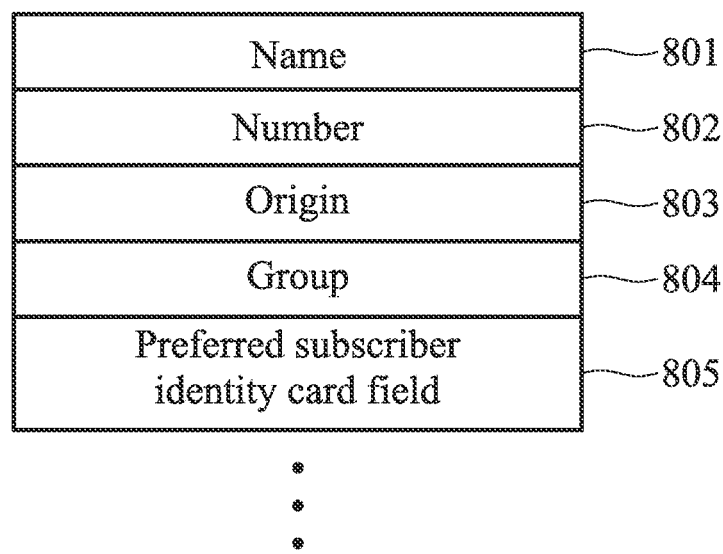
FIG. 8 shows an exemplary data structure for a contact entry stored in the memory device according to an embodiment of the invention.

FIG. 8 shows the data structure for an exemplary contact entry 800 stored in the memory device according to an embodiment of the invention. The "Name" field 801 and "Number" field 802 are the same as the "Name" field 601 and "Number" field 602 previously described, and may be directly copied from the first and second contact entries of the subscriber identity cards 101 and 102. The contact entry 800 may comprise additional fields to store more information. The "Origin" field 803 may be used to store information indicating where certain fields of this contact entry is copied from, i.e., whether that is copied from the subscriber identity card 101 or 102. The "Group" field 804 may be used to store information indicating which group this contact entry belongs to. By manipulating the MMI, the user may add one or more third contact entries into a preset group, such as a friend, family or coworker group, and so on, and accordingly store relevant information in the "Group" field 804. The "Preferred subscriber identity card" field 805 may be used to store information indicating one of the subscriber identity cards 101 and 102 as a preferred subscriber identity card to make a call to the destination address of this contact entry. By manipulating the MMI, the user may select one of the subscriber identity cards 101 and 102 as a preferred subscriber identity card and accordingly store relevant information in the "Preferred subscriber identity card" field 805. According to the embodiment of the invention, when executing step S702 as shown in FIG. 7, the processor may determine whether the destination address is currently stored in one of the first contact entries of the subscriber identity card 101 or one of the second contact entries of the subscriber identity card 102 by inspecting the "Origin" fields 803 of the third contacts entries, as shown in FIG. 8.

Figure 9A:
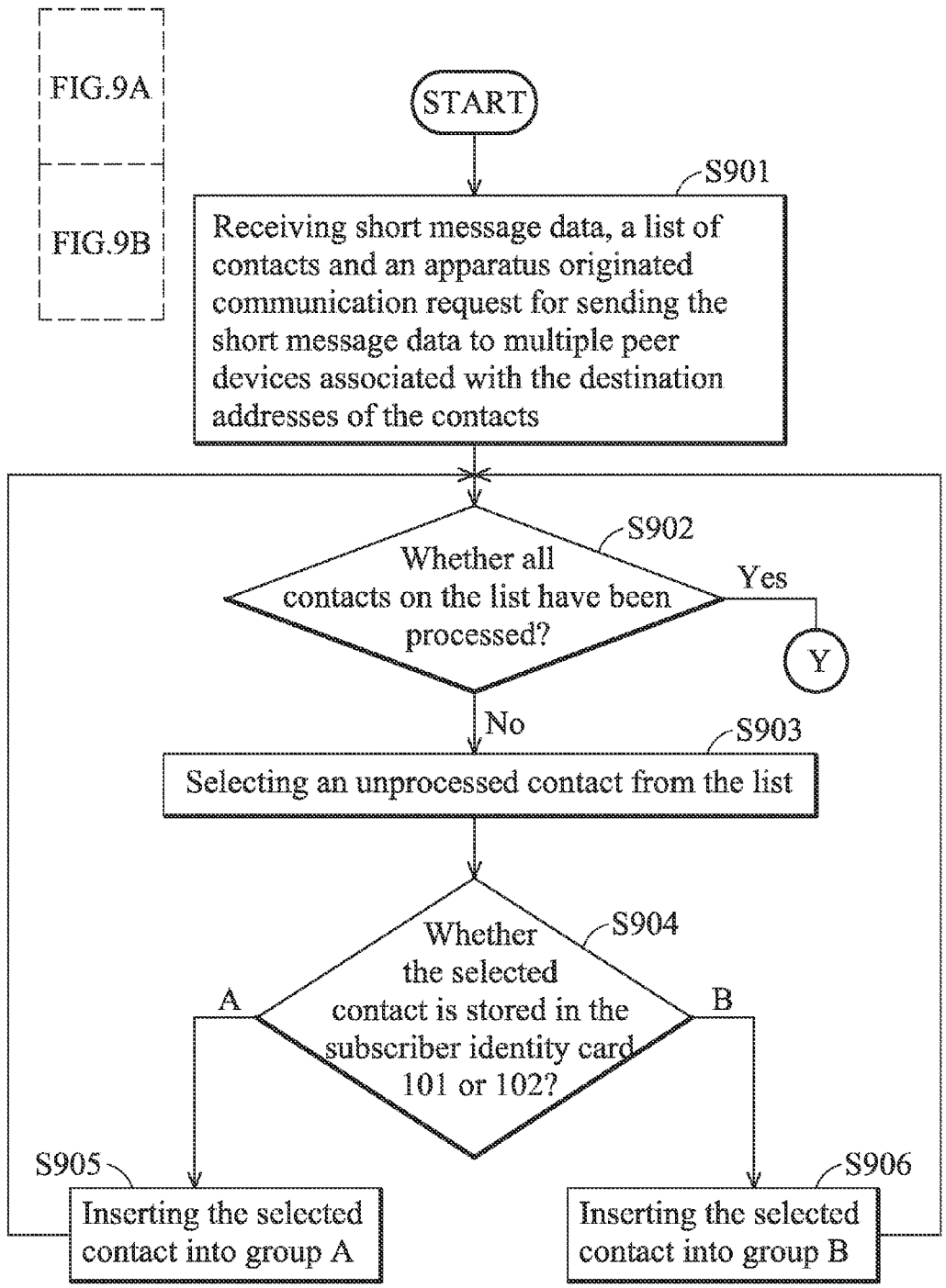
FIG. 9A and FIG. 9B show a flow chart of the method for handling the apparatus originated communication request according to another embodiment of the invention.
Figure 9B:
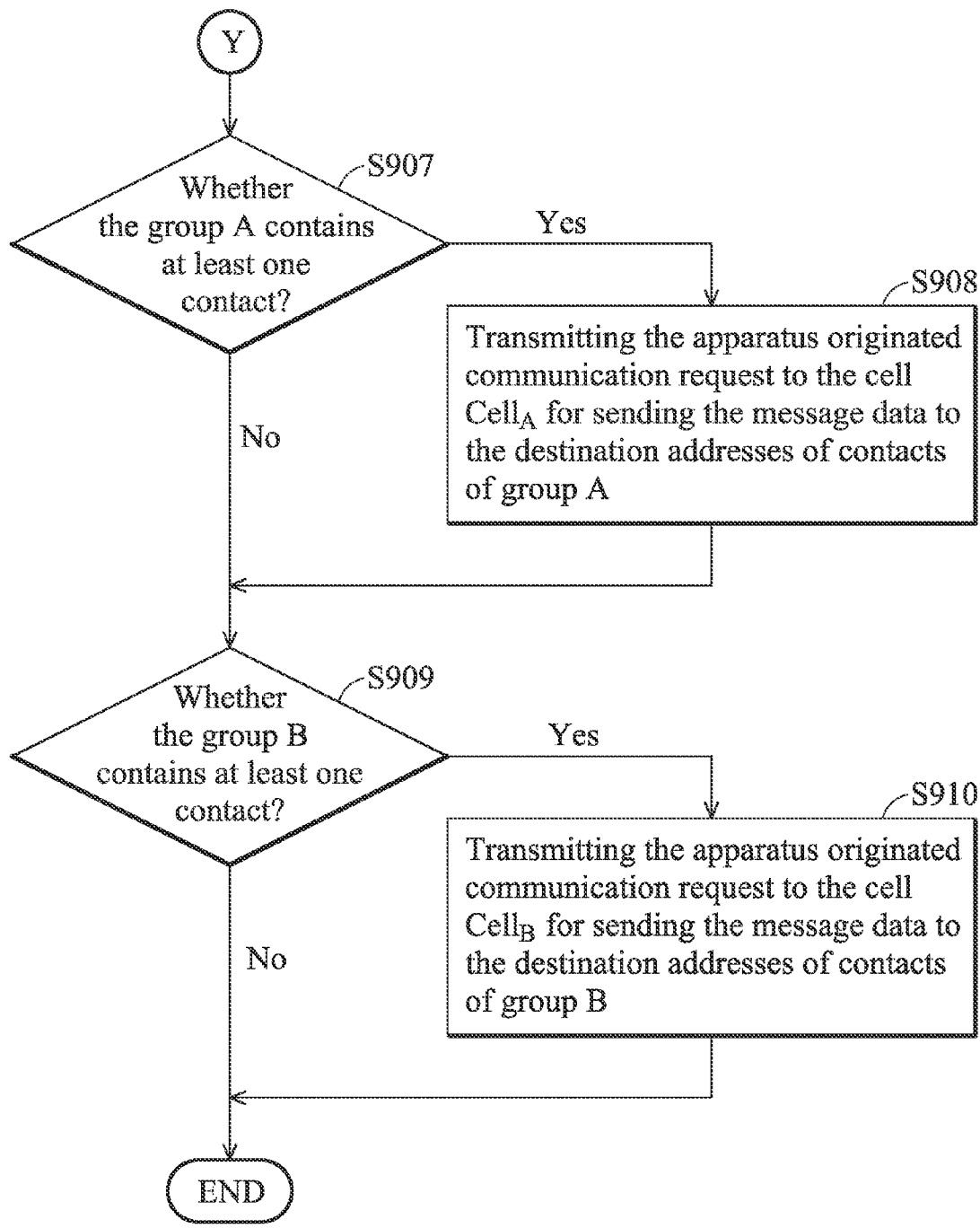

FIG. 9A and FIG. 9B show a flow chart of the method for handling the apparatus originated communication request according to a second embodiment of the invention. The embodiment begins when the processor, such as 105, 105A, 105B, or 105C, receives short message or multimedia message data and an apparatus originated communication request with a plurality of destination addresses, where the apparatus originated communication request instructs the processor to send the short message or multimedia message data to multiple peer devices associated with the destination addresses (Step 901). According to the embodiment of the invention, the apparatus originated communication request may be a group SMS communication request. The destination addresses may be represented as a list of contacts provided by the user by manipulating the MMI, where each contact containing a destination address. The processor may repeatedly determine whether all contacts on the list have been processed (Step S902), and select an unprocessed contact from the list (Step S903) when determining that not all contacts on the list have been processed. Next, the processor further determines whether the selected contact is currently stored one of the first contact entries of the subscriber identity card 101 or one of the second contact entries of the subscriber identity card 102 (Step S904). The processor may query the subscriber identity cards 101 and 102 by issuing commands such as READ RECORD, SELECT EF_ADN and the similar to find out where the selected contact is currently stored until all contacts are processed. The processor determines that the contact information is currently stored in the subscriber identity card 101 or 102 according to the results in response to the issued commands as described above. When the processor determines that the selected contact is currently stored in the subscriber identity card 101, the process goes to the path A and the processor inserts the selected contact into a group A (Step S905). Alternatively, when the processor determines that the destination address is currently stored in the subscriber identity card 102, the process goes to the path B and the processor inserts the selected contact into a group B (Step S906). It is to be understood that the data of groups A and B may be stored in a volatile memory in a relevant data structure such as an array, a queue, a linked list or the similar. After all contacts have been completely processed, the processor determines whether the group A contains at least one contact (Step S907). When the group A contains at least one contact, the processor transmits the apparatus originated communication request to the cell $Cell_A$ for sending the short message or multimedia message data to the destination addresses of contacts of group A (Step S908). In addition, the processor determines whether the group B contains at least one contact (Step S909). When the group B contains at least one contact, the processor transmits the apparatus originated communication request to the cell $Cell_B$ for sending the short message or multimedia message data to the destination addresses of contacts of the group B (Step S910). According to another embodiment of the invention, when executing the step S904 as shown in FIG. 9A, the processor may determine whether the selected contact is currently stored in the subscriber identity card 101 or the subscriber identity card 102 by inspecting the third contact entries stored in the memory device 106, 106A, 106B or 106C as previously described. As an example, the processor may also inspect the "Origin" field 803 as shown in FIG. 8 of the third contact entries when executing the step S904. In logical channel assignments and signaling procedures, the service type of an SMS communication request is set as MESSAGE when transmitting the CM-Service Request, reference may be made to FIG. 5. Traffic channel (TCH) may not be established when processing an SMS communication request. When processing a group SMS communication request, a radio resource (RR) connection may be reused and the CM-Service Request may be repeatedly transmitted until short message or multimedia message data is successfully sent out to the cell $Cell_A$ or $Cell_B$ for delivering it to all destination addresses of the group A or B. The RR connection may be released after all of the contacts have been processed.

Figure 10:
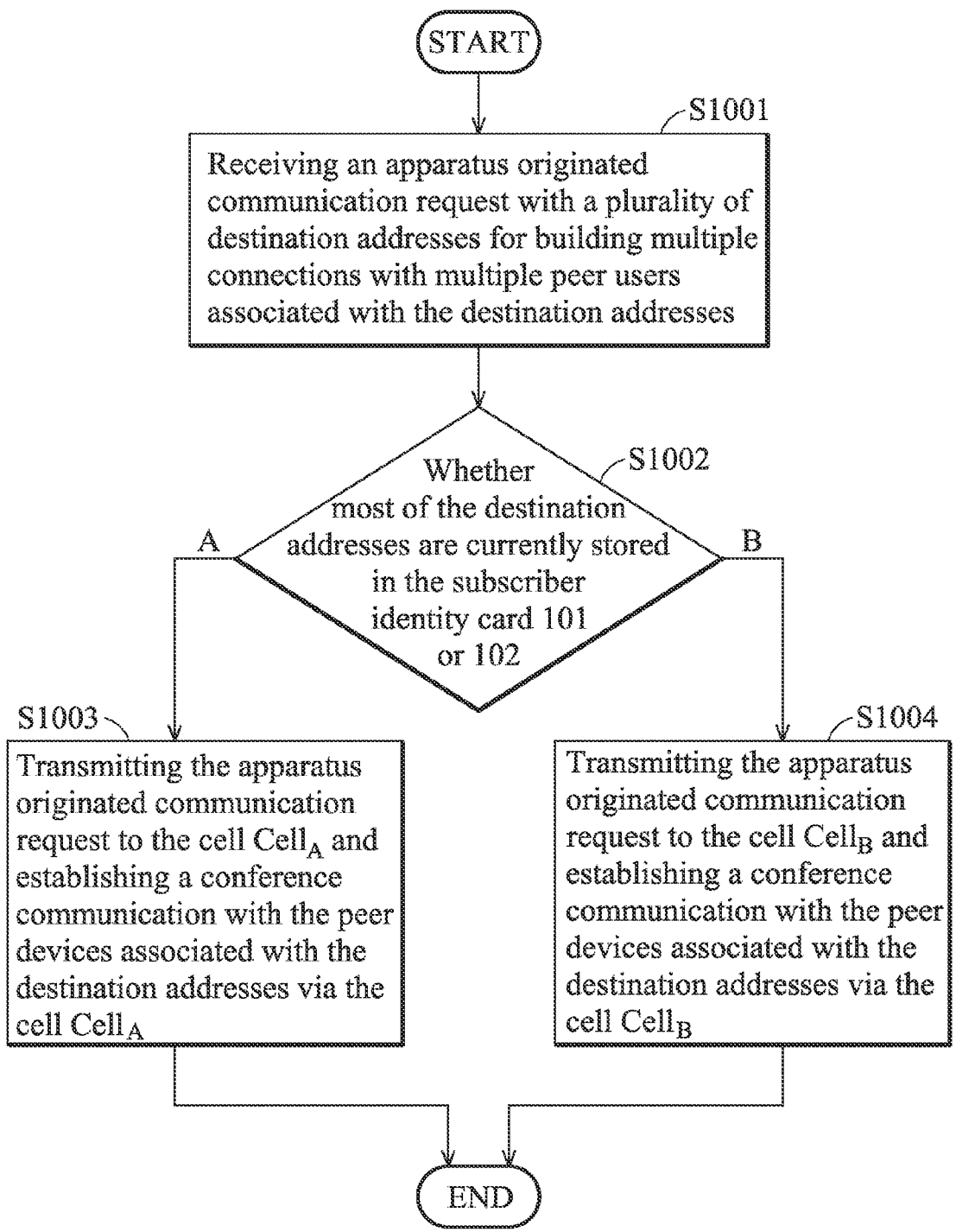
FIG. 10 shows a flow chart of the method for handling the apparatus originated communication request according to another embodiment of the invention.

FIG. 10 shows a flow chart of the method for handling the apparatus originated communication request according to a third embodiment of the invention. The embodiment begins when the processor, such as 105, 105A, 105B, or 105C, receives an apparatus originated communication request with a plurality of destination addresses, where the apparatus originated communication request instruct the processor to build multiple connections with multiple peer devices associated with the destination addresses (Step 1001). According to the embodiment of the invention, the apparatus originated communication request may be a conference communication request (e.g. a conference call) to direct to build multiple connections for establishing a conference communication between the user and multiple peer users associated with the destination addresses. Next, the processor determines whether most of the destination addresses are currently stored in the subscriber identity card 101 or 102 (Step S1002). According to the embodiment of the invention, the processor may determine whether each destination address is stored in one of the first contact entries or one of the second contact entries and count how many destination addresses are stored in the first and second contact entries respectively so as to determine most of the destination addresses are currently stored in the subscriber identity card 101 or 102. When the processor determines that most of the destination addresses are stored in the subscriber identity card 101, the process goes to the path A and the processor transmits the apparatus originated communication request to the cell $Cell_A$ and establishes the conference communication with the peer devices (or peer communication apparatuses) associated with the destination addresses via the cell $Cell_A$ (Step S1003). This conference communication may be established by invoking a supplementary service via a FACILITY message of the common information element procedure: "Build Multi Party Call" (Build-MPTY). Alternatively, when the processor determines that most of the destination addresses are stored in the subscriber identity card 102, the process goes to the path B and the processor transmits the apparatus originated communication request to the cell $Cell_B$ and establishes the conference communication with the peer devices (or peer communication apparatuses) associated with the destination addresses via the cell $Cell_B$ (Step S1004).

Figure 11:
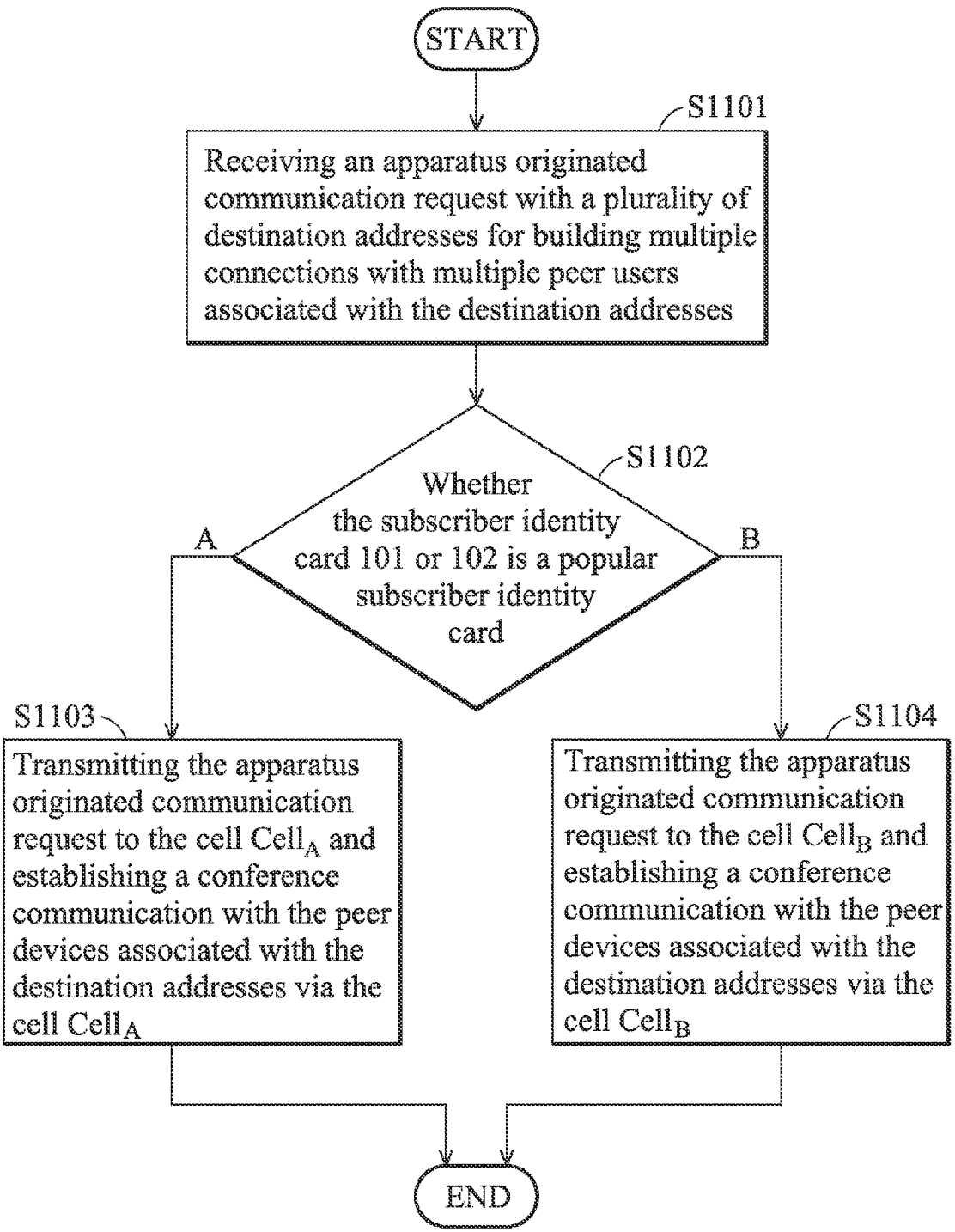
FIG. 11 shows a flow chart of the method for handling the apparatus originated communication request according to another embodiment of the invention.

According to another embodiment of the invention, when executing the step S1002 as shown in FIG. 10, the processor may also determine whether each destination address is currently stored in one of the first contact entries of the subscriber identity card 101 or one of the second contact entries of the subscriber identity card 102 by inspecting the "Origin" fields 803 of the third contact entries, as shown in FIG. 8. FIG. 11 shows another flow chart of the method for handling the apparatus originated communication request according to the third embodiment of the invention. After receiving an apparatus originated communication request with a plurality of destination addresses, where the apparatus originated communication request instruct the processor to build multiple connections with multiple peer devices associated with the destination addresses (Step 1101), the processor determines whether the subscriber identity card 101 or 102 is a popular subscriber identity card (Step 1102) by inspecting the third contacts stored in the memory device 106, 106A, 106B or 106C as previously described. The popular subscriber identity card is one has most of preference marks for the received destination addresses. As an example, the processor may inspect the "Preferred subscriber identity card" field 805 of third contact entries, as shown in FIG. 8, for each obtained destination address, count how many fields thereof indicating the subscriber identity card 101 and 102 respectively and determine one subscriber identity card with the highest count as the popular subscriber identity card. When the processor determines that the subscriber identity card 101 is the popular subscriber identity card, the process goes to the path A and the processor transmits the apparatus originated communication request to the cell $Cell_A$ and establishes the conference communication with the peer devices (or peer communication apparatuses) associated with the destination addresses via the cell $Cell_A$ (Step S1103). Alternatively, when the processor determines that the subscriber identity card 102 is the popular subscriber identity card, the process goes to the path B and the processor transmits the apparatus originated communication request to the cell $Cell_B$ and establishes the conference communication with the peer devices (or peer communication apparatuses) associated with the destination addresses via the cell $Cell_B$ (Step S1104). According to yet another embodiment of the invention, when executing step S1102, the processor may determine whether the subscriber identity card 101 or 102 is a popular subscriber identity card by inspecting the "Group" field 804 of the third contact entries, as shown in FIG. 8, for each obtained destination address. As an example, when most of the destination addresses belong to a specific group, the processor may determine to process the apparatus originated communication request via the preferred subscriber identity card determined for that specific group.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for handling apparatus originated communications, performed by a processor of a mobile communications apparatus, comprising:
receiving, by the processor, an apparatus originated communication request with a destination address;
determining, by the processor, whether the received destination address is currently stored in one of plurality of first contact entries of a first subscriber identity card or one of plurality of second contact entries of a second subscriber identity card; and
transmitting, by the processor, the apparatus originated communication request to a cell that the determined subscriber identity card camps on to establish a wireless communication with a peer device associated with the received destination address.

2. The method as claimed in claim 1, wherein the apparatus originated communication request is a voice communication request, a data communication request, a video communication request, a short message service (SMS) communication request, or a voice over Internet Protocol (VoIP) communication request.

3. The method as claimed in claim 1, further comprising:
storing, by the processor, a plurality of third contact entries in a memory device, where a portion of the content of the third contact entries is copied from the first and second contact entries, each third contact entry further comprising origination information indicating where partial content of this entry is copied from,
wherein the determination step further comprises determining, by the processor, whether the destination address is currently stored in one of the first contact entries or one of the second contact entries by inspecting the origination information of the third contact entries.

4. The method as claimed in claim 1, wherein at least one of the first subscriber identity card and the second subscriber identity card is the subscriber identity module (SIM) card corresponding to the global system for mobile communications (GSM) communication system, the universal subscriber identity module (USIM) card corresponding to the universal mobile telecommunications system (UMTS) communication system, or the removable user identity module (RUIM) card or the CDMA subscriber identity module (CSIM) card corresponding to the code division multiple access (CDMA) 2000 communication system.

5. The method as claimed in claim 1, wherein the determination step further comprises issuing, by the processor, commands to the first and second subscriber identity cards and determines whether the destination address is currently stored in one of the first contact entries or one of the second contact entries according to reply results.

6. The method as claimed in claim 1, wherein each destination address comprises a series of numbers representing a phone number.

7. The method as claimed in claim 1, wherein each destination address comprises a series of numbers representing an Internet Protocol (IP) address.

8. A method for handling apparatus originated communications, performed by a processor of a mobile communications apparatus, comprising:

receiving, by the processor, message data and an apparatus originated communication request with a plurality of destination addresses;

determining, by the processor, whether each received destination address is currently stored in a first or a second subscriber identity cards;

grouping, by the processor, the destination addresses currently stored in a plurality of first contact entries into a first group;

grouping, by the processor, the destination addresses currently stored in a plurality of second contact entries into a second group;

sending, by the processor, the message data to the destination addresses of the first group via a first cell that the first subscriber identity card camps on; and sending, by the processor, the message data to the destination addresses of the second group via a second cell that the second subscriber identity card camps on.

9. The method as claimed in claim 8, wherein the message data is short message service (SMS) data or multimedia message service (MMS) data.

10. The method as claimed in claim 8, further comprising:
storing, by the processor, a plurality of third contact entries in a memory device, where which a portion of the content of the third contact entries is copied from the first and second contact entries, each third contact entry further comprising origination information indicating where partial content of this entry is copied from, wherein the determination step further comprises determining, by the processor, whether the destination address is currently stored in one of the first contact entries or one of the second contact entries by inspecting the origination information of the third contact entries.

11. The method as claimed in claim 8, wherein at least one of the first subscriber identity card and the second subscriber identity card is the subscriber identity module (SIM) card corresponding to the global system for mobile communications (GSM) communication system, the universal subscriber identity module (USIM) card corresponding to the universal mobile telecommunications system (UMTS) communication system, or the removable user identity module (RUIM) card or the CDMA subscriber identity module (CSIM) card corresponding to the code division multiple access (CDMA) 2000 communication system.

12. The method as claimed in claim 8, wherein the determination step further comprises issuing, by the processor, commands to the first and second subscriber identity cards and determines whether the destination address is currently stored in one of the first contact entries or one of the second contact entries according to reply results.

13. A method for handling apparatus originated communications, performed by a processor of a mobile communications apparatus, comprising:
receiving, by the processor, an apparatus originated communication request with a plurality of destination addresses for establishing a wireless conference communication with a plurality of peer devices having the received destination addresses;

determining, by the processor, whether each received destination address is currently stored in a first or a second subscriber identity card;

sending, by the processor, the apparatus originated communication request to a first cell that the first subscriber identity card camps on when most of the received destination addresses correspond to the first subscriber identity card; and sending, by the processor, the apparatus originated communication request to a second cell that the second subscriber identity card camps on when most of the received destination addresses correspond to the second subscriber identity card.

14. The method as claimed in claim 13, further comprising:
storing, by the processor, a plurality of third contact entries in a memory device, where a portion of the content of the third contact entries is copied from the first and second contact entries, each third contact entry further comprising origination information indicating where partial content of this entry is copied from, wherein the determination step further comprises determining, by the processor, whether the destination address is currently stored in one of the first contact entries or one of the second contact entries by inspecting the origination information of the third contact entries.

15. The method as claimed in claim 13, wherein the determination step further comprises issuing, by the processor, commands to the first and second subscriber identity cards and determines whether the destination address is currently stored in one of the first contact entries or one of the second contact entries according to reply results.

16. A method for handling apparatus originated communications, performed by a processor of a mobile communications apparatus, comprising:
storing, by the processor, a plurality of contact entries in a memory, wherein each contact entry comprises a destination address and preference information indicating one of the first and second subscriber identity cards as a preferred subscriber identity card for this destination address;

receiving, by the processor, an apparatus originated communication request with a plurality of destination addresses for establishing a wireless conference communication with a plurality of peer devices having the received destination addresses;

sending, by the processor, the apparatus originated communication request to a first cell that the first subscriber identity card camps on when most of the preference information of the contact entries indicates the first subscriber identity card; and sending, by the processor, the apparatus originated communication request to a second cell that the second subscriber identity card camps on when most of the preference information of the contact entries indicates the second subscriber identity card.

17. A method as claimed in claim 16, wherein at least one of the first subscriber identity card and the second subscriber identity card is the subscriber identity module (SIM) card corresponding to the global system for mobile communications (GSM) communication system, the universal subscriber identity module (USIM) card corresponding to the universal mobile telecommunications system (UMTS) communication system, or the removable user identity module (RUIM) card or the CDMA subscriber identity module (CSIM) card corresponding to the code division multiple access (CDMA) 2000 communication system.

* * * * *